United States Patent
Neunteufl et al.

(10) Patent No.: US 7,334,561 B2
(45) Date of Patent: Feb. 26, 2008

(54) INTERNAL COMBUSTION ENGINE

(75) Inventors: Klemens Neunteufl, Graz (AT); Eduard Unger, Leibnitz (AT); Christian Roduner, Graz (AT)

(73) Assignee: AVL List GmbH, Graz (AT)

( * ) Notice: Subject to any disclaimer, the term of this patent is extended or adjusted under 35 U.S.C. 154(b) by 71 days.

(21) Appl. No.: 10/564,488

(22) PCT Filed: Jul. 8, 2004

(86) PCT No.: PCT/AT2004/000244

§ 371 (c)(1),
(2), (4) Date: Feb. 21, 2006

(87) PCT Pub. No.: WO2005/005813

PCT Pub. Date: Jan. 20, 2005

(65) Prior Publication Data

US 2006/0169243 A1    Aug. 3, 2006

(30) Foreign Application Priority Data

Jul. 15, 2003  (AT) ............................ GM 504/2003
Apr. 27, 2004  (AT) ............................. A 723/2004
Apr. 27, 2004  (AT) ............................. A 724/2004

(51) Int. Cl.
*F02B 17/00* (2006.01)
*F02B 5/00* (2006.01)
*F02M 7/00* (2006.01)
*F02M 25/07* (2006.01)

(52) U.S. Cl. ...................... 123/295; 123/305; 123/435; 123/568.21

(58) Field of Classification Search ................ 701/104, 701/105, 111; 123/295, 305, 435, 568.21
See application file for complete search history.

(56) References Cited

U.S. PATENT DOCUMENTS

| | | | |
|---|---|---|---|
| 4,760,830 A | 8/1988 | Bullis et al. | 123/501 |
| 5,832,880 A | 11/1998 | Dickey | 123/25 C |
| 6,158,413 A | 12/2000 | Kimura et al. | 123/306 |
| 6,260,520 B1 | 7/2001 | Van Reatherford | 123/48 AA |
| 6,276,334 B1 | 8/2001 | Flynn et al. | 123/435 |
| 6,286,482 B1 | 9/2001 | Flynn et al. | 123/435 |
| 6,293,246 B1 | 9/2001 | Tanahashi et al. | |
| 6,338,245 B1 | 1/2002 | Shimoda et al. | 60/285 |

FOREIGN PATENT DOCUMENTS

| | | |
|---|---|---|
| AT | 007207 | 11/2004 |
| DE | 3134631 | 3/1983 |
| DE | 4322319 | 1/1995 |
| DE | 19749817 | 5/1999 |
| EP | 1085176 | 3/2001 |
| GB | 2091000 | 7/1982 |

*Primary Examiner*—Stephen K. Cronin
*Assistant Examiner*—Johnny H. Hoang
(74) *Attorney, Agent, or Firm*—Dykema Gossett PLLC (57) ABSTRACT

According to the invention, noise of an internal combustion engine is reduced by dynamically correcting the moment of injection when the engine is in the transient mode.

24 Claims, 8 Drawing Sheets

INTERNAL COMBUSTION ENGINE

BACKGROUND OF THE INVENTION

1. Field of the Invention

The invention relates to a method of operating an internal combustion engine, more specifically a diesel combustion engine.

2. The Prior Art

Combustion processes for diesel combustion engines with substantially homogeneous combustion—what are termed alternative diesel combustion processes—make it possible to drastically reduce engine emissions. Specifically, concurrent reduction of $NO_x$ and of particles in the engine exhaust is thereby possible. These new combustion processes rely on homogenization of the in-cylinder charge prior to the combustion event. Diesel combustion engines with homogeneous combustion are known from the printed documents U.S. Pat. No. 5,832,880 A, U.S. Pat. No. 6,260,520 B1, U.S. Pat. No. 6,276,334 B1 or from U.S. Pat. No. 6,286,482 B1.

Figure 1:
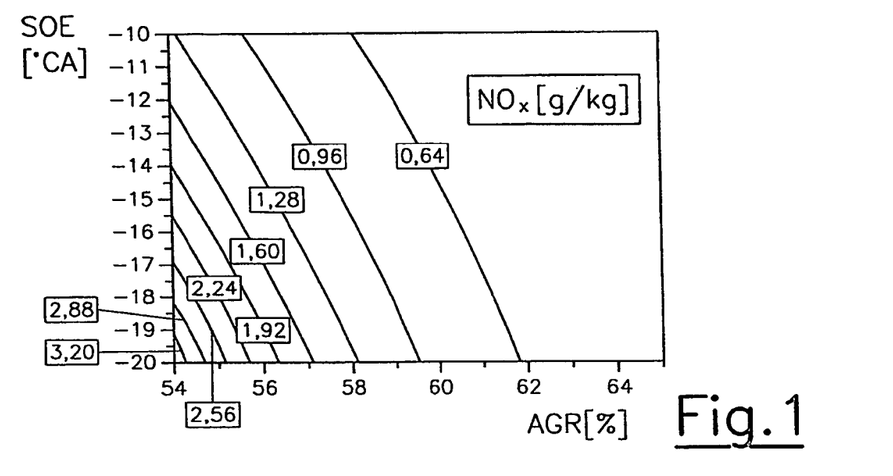

As contrasted with conventional combustion processes, it can be observed in alternative combustion processes that the engine exhausts ($NO_x$, particles, HC, CO and noise) are much more sensitive to the engine operation parameters (injection timing, exhaust gas recirculation rate, fresh air temperature, temperature of the intake manifold, pressure in the intake manifold, exhaust back pressure, coolant temperature, atmospheric pressure). In reverse, changing quite slightly, by a few percent, the exhaust gas recirculation rate suffices to considerably change the $NO_x$ emissions for example. In this context, FIG. 1 shows the influence of the exhaust gas recirculation rate and of injection timing on the $NO_x$ emission of the engine during alternative combustion. As can be seen from FIG. 2, injection timing and exhaust gas recirculation rate also have considerable influence on particle emission. A slight change in injection timing suffices to heavily influence particle emission.

This fact is at the origin of the need for exactly complying with the engine operation parameters required for alternative combustion processes in order to be able to tap the full potential of alternative diesel combustion processes. With the currently utilized methods for computing certain engine operation parameters (such as injection timing and desired value for the exhaust gas recirculation rate) the control within the engine control system is a simple control as a function of engine speed and engine load, that is to say there is no so-called "closed loop" control. For conventional combustion processes, which have far less sensitiveness between the engine operation parameters and the resulting engine emissions, this simple control is sufficient. Using alternative combustion processes for diesel engines, these control processes however are insufficient because of the sensitiveness described so that the search for new methods continues. The reason therefor is that in the simple control calculation of certain engine operation parameters such as injection timing and exhaust gas recirculation rate currently used, the influence of engine speed, engine load, fresh air temperature, atmospheric pressure and coolant temperature is only taken into consideration statically in characteristic diagrams or lines within the engine control system.

When operating a diesel engine with alternative combustion together with the currently used control strategy, two critical operating conditions occur. Firstly, if the exhaust gas recirculation rate is too high, combustion becomes instable. The 50% mass fraction burned is too near top dead center, which results in incomplete combustion with high emissions (HC and CO) and in an instable engine torque. Secondly, if the exhaust gas recirculation rate is too low, the 50% mass fraction burned is advanced, this involving considerable increase of combustion noise.

A system for controlling the exhaust gas recirculation rate in a compression ignition internal combustion engine is known from DE 31 34 631 A1, in which a desired value for ignition delay is determined and the actual value of ignition delay is controlled to match this desired value. The desired value for ignition delay thereby originates from an engine characteristic map. Ignition delay time is obtained comparing the signals, for example the start of injection by an injection nozzle and of a pressure sensor connected to the combustion chamber.

An automatic control for a self-igniting internal combustion engine in which the in-cylinder peak pressure is measured and compared with a desired value is known from GB 2 091 000 A. The control variable changed as a result of this difference is injection timing.

Both in DE 31 34 631 A1 and in GB 2 091 000 A, only one control variable is changed. This is not sufficient for controlling a diesel combustion engine with homogeneous combustion.

The most important variables for determining the combustion process in an internal combustion engine are the phasing of the combustion process or of start of combustion, the maximum speed of pressure increase in the cylinder, and the peak pressure.

In an internal combustion engine in which combustion substantially occurs through self-ignition of a directly injected quantity of fuel, the determining variables are mainly determined by injection timing, charge composition and ignition delay. These parameters are in turn determined by a great number of influencing variables such as speed, fuel quantity, intake temperature, boost pressure, effective compression ratio, inert gas content of the in-cylinder charge and component temperature.

Conventional diesel combustion essentially is a diffusion process in which air and fuel are not mixed together but separately delivered to the combustion zone. Conventional diesel combustion is characterized by the inhomogeneous distribution of air and fuel. The concentration of the fuel in the injection spray decreases continuously from the inside to the outside toward the region of the surrounding air-residual gas mixture. Combustion in zones at air conditions within the range of stoichiometric air ratio and below leads to high peak temperatures resulting in thermal $NO_x$ formation. Further, lack of oxygen in rich zones combined with high temperatures results in the formation of soot.

A more stringent legal framework makes it necessary to always find new ways for designing combustion processes in order to reduce emission of soot particles and $NO_x$ emission in diesel combustion engines.

It is known to reduce $NO_x$ and soot emission in the exhaust by increasing ignition delay, advancing therefor the ignition timing so that combustion occurs through self-ignition of a lean fuel-air mixture. A possible variant thereof is termed HCLI process (Homogeneous Charge Late Injection). When such mixture combustion is carried out, fuel injection occurs sufficiently far from the top dead center of the compression period, so that a largely homogeneous fuel-air mixture is obtained. Exhaust gas recirculation permits to keep combustion temperature below the minimum temperature needed for $NO_x$ to be generated. Since homogenization of fuel and air is time-dependent, the realization of this process is restricted, being dependent both on speed and on charge, as particle emission increases if homogenization is insufficient.

U.S. Pat. No. 6,338,245 B1 describes a diesel combustion engine relying for operation on the HCLI process in which combustion temperature and ignition delay are adjusted so that at lower and medium part load the combustion temperature is lower than the $NO_x$ formation temperature and the air ratio is greater than the value that is relevant for soot formation. The combustion temperature is thereby controlled by changing the exhaust gas recirculation rate and ignition delay, by fuel injection timing. At medium and high load, the combustion temperature is lowered to such an extent that the formation of both $NO_x$ and soot is avoided. The disadvantage thereof is that, at medium part load particularly, a low air ratio occurs together with low combustion temperatures with poor efficiency trade-off.

U.S. Pat. No. 6,158,413 A describes a direct injection diesel combustion engine in which fuel injection is not set to take place before compression top dead center and in which oxygen concentration in the combustion chamber is minimized through exhaust recirculation. This method of operation is also termed the HPLI process (Highly Premixed Late Injection). Due to the temperature level that decreases after top dead center—as compared to a conventional injection before top dead center—and to the increased quantity of recirculated exhaust over conventional operation, ignition delay is longer than in what is termed diffusion combustion. The low temperature level controlled by the exhaust gas recirculation rate causes the combustion temperature to remain below the value relevant for $NO_x$ formation. The long ignition delay effected by the later ignition time permits to obtain a good blend so that, as a result thereof, the local lack of oxygen during combustion of the mixture is significantly reduced and the formation of particles is decreased. Retarding the combustion process results in a lower maximum temperature but at the same time in a higher mean temperature at a given late crank angle so that the burning off of soot is enhanced. Moreover, causing combustion to occur in the expansion stroke together with the high exhaust gas recirculation rate leads, in spite of the larger quantity of pre-mixed fuel due to the long ignition delay and, as a result thereof, in spite of the higher maximum combustion rate, to an in-cylinder pressure increase rate that does not exceed the admissible value. The disadvantage thereof is the poor efficiency in the lower part load range.

The Austrian Utility Model Application GM 702/2002 suggests operating a diesel combustion engine in the lower part load range in the HCLI mode, in the medium part load range in the HPLI mode and in the full load range with conventional diesel combustion. As a result, the internal combustion engine can be operated with high efficiency and low $NO_x$ and soot emissions in any load range.

The HCLI process and the HPLI process pertain to the alternative diesel combustion processes.

It is known to determine injection timing for the fuel on the basis of engine operation parameters or through the control of characteristic diagrams. It is further known to compute injection timing through a combustion regulator with feedback on the actual combustion situation. For stationary condition, injection timings determined in this manner are sufficient.

In dynamic operation of the engine though, transiently occurring differences in the in-cylinder charge as compared to the stationary desired values result in a difference between the resulting combustion noise and the stationary desired values.

A method for controlling an internal combustion engine is known from DE 43 22 319 C2 in which a first actual value is prescribed starting from a value λ and said first actual value and a first desired value are prescribed by a first control means, starting from a first control variable. Further, a second actual value can be prescribed from a quantity of air and, starting from said second actual value and a second desired value, a second control variable is prescribed by a second control means. The desired values are thereby chosen so that, if certain operating conditions are given, the desired values are prescribed for the quantity of air, and if these certain operating conditions are not given, desired values are prescribed for the value λ.

It is known to determine start of injection or combustion situation in an internal combustion engine using for example an in-cylinder pressure sensor and to obtain therefrom control signals for controlling the internal combustion engine such as injection timing. DE 197 49 817 A1 suggests computing the start of injection and the combustion situation from the measured pressure history and from the calculated pressure history.

It is the object of the invention to control combustion in a diesel combustion engine with homogeneous combustion in the simplest possible way and with the greatest possible accuracy. It is another object to develop a method by means of which the internal combustion engine can be operated in the optimal mode at each operating point. It is still another object of the invention to propose a method of operating an internal combustion engine by means of which, in dynamic operation of the engine, the combustion noise can, as far as practicable, be kept at the values of the stationary engine operation.

SUMMARY OF THE INVENTION

In accordance with the invention, this makes it possible to detect a condition variable in the cylinder, preferably the pressure, the temperature, the ion flow or the output signal of an optical principle of measurement as a function of the crank angle and to obtain therefrom a signal about the cylinder condition, to determine from the cylinder condition signal at least two characteristic cycle values from the group comprising mass fraction of the injected fuel burned, maximum pressure increase in the cylinder, combustion noise, start of combustion or duration of combustion, to compare the determined characteristic cycle values with desired values for the characteristic cycle values entered in a characteristic diagram and to compute a given difference between the two values and to supply the difference to a regulation algorithm and to adjust as a correcting variable the time of fuel ignition of at least one injection event and/or the inert gas fraction in the cylinder in order to stabilize combustion and/or to minimize noise and exhaust emission. This makes it possible to stabilize combustion and to minimise noise and exhaust emission. Preferably, there is provided that the 50 % mass fraction burned of the injected fuel and the maximum in-cylinder pressure increase is determined.

The newly developed method relies on the reflection consisting in dynamically calculating certain engine operation parameters such as injection timing and inert gas fraction in the cylinder rate depending on variables that describe the actual condition inside the cylinder.

In order to detect the actual condition of the cylinder, a sensor detects for example the in-cylinder pressure as a function of the crank angle. Then, certain characteristic cycle values are calculated from this sensor signal in an interval of 720° crank angle. Accordingly, in-cylinder pressure history is described by two characteristic values computed from the pressure history itself.

These two characteristic values more specifically are the timing of the 50% mass fraction of the injected fuel burned and the maximum in-cylinder pressure increase. Combustion noise, start of combustion or duration of combustion may also be utilized as characteristic cycle values to describe the combustion process.

The characteristic cycle values may be determined either from the output signal of a sensor, making use of an acoustic, optical, electrical, thermodynamic or mechanical principle of measurement or through a mathematical model. A combination of a sensor-based approach with a model-based approach may also find application.

Within the scope of the method developed, each of the actual characteristic cycle values developed are then compared with the desired value for the characteristic cycle values each entered in a characteristic diagram depending on the engine speed and the engine load, and a given difference between the two values is calculated. This difference is next supplied to a regulation algorithm. The regulator dynamically calculates the new engine operation parameters such as injection timing and recirculated exhaust mass needed in order to maintain the desired cylinder condition. A precontrol value entered in a respective characteristic diagram is added to the values calculated by the regulator in order to improve the dynamics of the system as a whole.

As contrasted with conventional control processes, the method of the invention also allows for stable control of the combustion process with optimum emission conditions even in the transient mode, the timing of fuel injection being controlled by at least one injection event and the maximum in-cylinder pressure increase being concurrently controlled via the inert gas fraction in accordance with the values prescribed by the regulator. In accordance with an advantageous implementation variant of the invention, there is provided that the correcting variables timing of fuel injection of at least one injection event and inert gas fraction inside the cylinder be adjusted simultaneously by means of the regulation algorithm.

To control the inert gas in the cylinder, there may be provided that the supply and variation of the inert gas mass in the cylinder be carried out through external exhaust gas recirculation or through in-cylinder exhaust gas recirculation or by combining internal and external exhaust gas recirculation.

Within the scope of the invention, the following steps are provided to resolve the problem posed:
 selecting at least one, preferably at least two, characteristic engine operation parameters,
 entering at least one threshold value for each selected characteristic engine operation parameter,
 associating value ranges separated by at least one threshold value with each engine operation parameter, at least one first value range being associated with the first mode of operation and at least one second value range being associated with the second mode of operation,
 comparing the actual values of the selected characteristic engine operation parameters with the value ranges,
 switching to the second mode of operation or remaining in the second mode of operation when all the selected characteristic engine operation parameters lie within the second value ranges.

Preferably, there is provided that switching to the first mode of operation occurs or that the first mode of operation is maintained when at least one actual value of a selected characteristic engine operation parameter lies within the first value range.

At least two characteristic engine operation parameters are selected from the group comprising engine speed, engine load, engine coolant temperature, atmospheric pressure, temperature of the exhaust gas after-treatment system, exhaust gas temperature upstream of the exhaust gas after-treatment system, exhaust gas temperature downstream of the exhaust gas after-treatment system, speed of the engine speed change, speed of the engine load change and actual transmission ratio of the driving train. The engine load may thereby be defined for example by the torque, the injected quantity or the position of the accelerator pedal. An oxidation catalytic converter is preferably provided as an exhaust gas after-treatment system. The actual transmission ratio of the driving train is advantageously defined by the number of the gear.

The first mode of operation is preferably associated with the conventional diesel combustion and the second mode of operation, with an alternative diesel combustion method.

Each of the selected characteristic engine parameters is at least compared with a threshold value that has been entered. For each of the engine operation parameters used, the threshold values are stored either as fixed values (e.g.: upper threshold value for engine speed of about 4,000 rpm) or as dependent values (e.g.: characteristic line against the engine speed, characteristic line against the engine speed and the engine load). The threshold values may also have a hysteresis, i.e., the threshold values are dependent on the direction in which the engine operation parameter of concern changes. If every engine operation parameter selected lies within the admissible value range defined by the corresponding threshold values, switching from conventional to alternative diesel combustion occurs. As soon as one of the input variables leaves the admissible value range defined by the corresponding threshold values, switching from alternative to conventional diesel combustion occurs.

Further, the solution of the problem is achieved by the following steps:
 determining a desired value for injection timing and/or a combustion situation,
 determining a desired value for the ratio fresh air mass to inert gas mass inside the cylinder and/or for the air/fuel ratio in the exhaust,
 measuring or computing an actual value for the ratio fresh air mass to inert gas mass inside the cylinder and/or for the air/fuel ratio in the exhaust,
 calculating the difference between the desired value and the actual value of the ratio fresh air mass to inert gas mass inside the cylinder or of the air/fuel ratio in the exhaust,
 correcting the desired value of injection timing or the combustion situation as a result of the difference between the desired value and the actual value of the ratio fresh air mass to inert gas mass or of the air/fuel ratio in the exhaust.

The desired values can be calculated from at least one actual engine parameter or selected from data filed in a characteristic diagram.

If injection timing is determined by simple control, that is to say without any feedback about the actual combustion situation, this predetermined injection timing can be corrected dynamically. Correction is thereby performed as a function of the difference between the desired value required for the ratio fresh air mass to inert gas mass and the measured and/or calculated actual value for the ratio fresh air mass to inert gas mass inside the cylinder. If the actual value for the ratio fresh air mass to inert gas mass is smaller than the desired value for the ratio fresh air mass to inert gas mass, with the inert gas mass fraction inside the cylinder being too high or the fresh air mass fraction too low as a result thereof, injection timing is advanced. If the actual value for the ratio fresh air mass to inert gas mass is higher than the desired value for the ratio fresh air mass to inert gas mass, with the inert gas mass fraction being too low or the fresh air mass fraction too high as a result thereof, injection timing is retarded.

As an alternative or in addition thereto, correction may be performed as a function of the difference between the desired value required for the air/fuel ratio in the exhaust gas and the measured and/or calculated actual value for the air/fuel ratio in the exhaust gas. If the actual value of the air/fuel ratio in the exhaust gas is smaller than the desired value of the air/fuel ratio in the exhaust gas, with the inert gas mass fraction in the cylinder being too high as a result thereof, injection timing is advanced. If, by contrast, the actual value of the air/fuel ratio in the exhaust gas is greater than the desired value of the air/fuel ratio in the exhaust gas, with the inert gas mass fraction in the cylinder being too small as a result thereof, injection timing is retarded.

If injection timing is calculated through a combustion controller, meaning in a closed loop controller with feedback about the actual combustion situation, the desired value for the combustion situation is corrected dynamically, for example additively. Correction may thereby be performed as a function of the difference between the desired value for the ratio of fresh air mass to inert gas mass and the actual value measured and/or calculated for the fresh air mass to inert gas mass ratio inside the cylinder. If the actual value for the ratio of fresh air mass to inert gas mass is smaller than the desired value for the ratio of fresh air mass to inert gas mass, with the inert gas mass fraction in the cylinder being too high or the fresh air mass fraction too low as a result thereof, the required desired value for the combustion situation is advanced. If, by contrast, the actual value of the ratio of fresh air mass to inert gas mass is greater than the desired value for the ratio of fresh air mass to inert gas mass, with the inert gas mass fraction in the cylinder being too low or the fresh air mass fraction too high as a result thereof, the required desired value for the combustion situation is retarded. Likewise, correction may be determined as a function of the difference between the required desired value of the air/fuel ratio in the exhaust gas and the actual value measured and/or calculated for the air/fuel ratio in the exhaust gas. If the actual value of the air/fuel ratio in the exhaust gas is smaller than the desired value of the air/fuel ratio in the exhaust gas, with the inert gas mass fraction in the cylinder being too high as a result thereof, the required desired value for the combustion situation is advanced. If, by contrast, the actual value of the air/fuel ratio in the exhaust gas is greater than the desired value of the air/fuel ratio in the exhaust gas, with the inert gas mass fraction in the cylinder being too small as a result thereof, the required desired value for the combustion situation is retarded.

By correcting injection timing and/or the combustion situation as a function of the difference between the actual and the desired values for the ratio fresh air mass to inert gas mass in the cylinder and/or the air/fuel ratio in the exhaust gas, a difference between the transient and the stationary combustion noise resulting from transiently occurring differences between the cylinder charge and the stationary desired value may be avoided in dynamic engine operation.

The invention will be described in closer detail herein after with reference to the attached drawings.

BRIEF DESCRIPTION OF THE DRAWINGS

FIG. 1 shows the influence of the injection timing and of the exhaust gas recirculation rate upon $NO_x$ engine emission, FIG. 2 the influence of the injection timing and of the exhaust gas recirculation rate upon particle emission, FIG. 3 an in-cylinder pressure—crank angle diagram, FIG. 4 schematically a regulator structure of the method of the invention, FIG. 5 the influence of fuel injection timing upon the location of the 50% mass fraction burned, FIG. 6 the influence of the inert gas mass upon the maximum in-cylinder pressure increase, FIG. 7 the correlation between the maximum in-cylinder pressure increase and the resulting combustion noise in the case of alternative combustion, FIG. 8 a valve lift—crank angle diagram for internal exhaust recirculation, FIG. 9 a diagram with different engine parameters when carrying out the method of the invention, FIG. 10 a speed—time diagram, FIG. 11 a torque—time diagram, FIG. 12 a 50% mass fraction burned—time diagram, FIG. 13 an engine noise—time diagram for transient engine operation when carrying out the method of the invention, FIG. 14 schematically the decision structure for switching between the operating modes, FIG. 15 a representation explaining the dynamic correction of injection timing during controlled operation, and FIG. 16 a representation explaining the dynamic correction of the desired value of the combustion location during regulated operation.

DETAILED DESCRIPTION OF THE PREFERRED EMBODIMENTS

Figure 2:
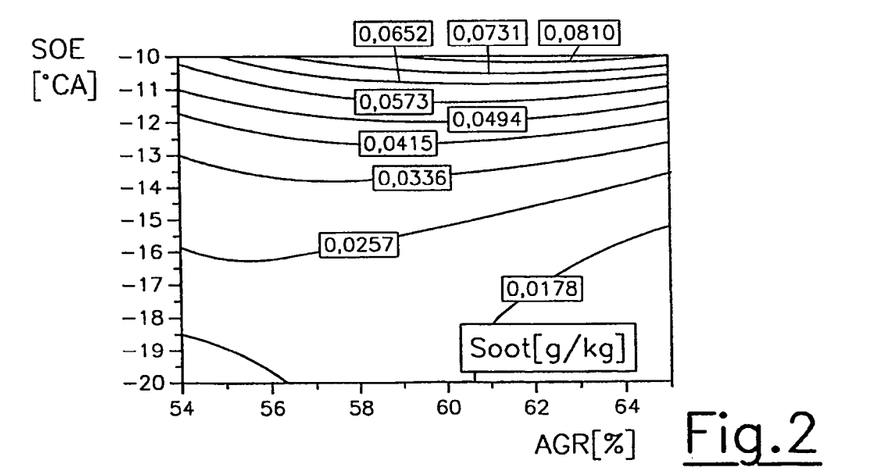

With alternative combustion processes relying for operation on homogenization of the cylinder charge prior to the combustion event, a considerably higher sensitiveness of engine emission ($NO_x$, particles, HC, CO and noise) to the engine operation parameters (injection timing, exhaust gas recirculation EGR rate, fresh air temperature, temperature of the intake manifold, pressure in the intake manifold, exhaust back pressure, coolant temperature, atmospheric pressure) over conventional combustion processes can be observed. FIG. 1 illustrates by way of example the influence of the exhaust gas recirculation rate EGR and of injection timing SOE before top dead center upon $NO_x$ engine emission during alternative combustion. It can be seen that changing the exhaust gas recirculation EGR rate by a few percent results in a significant change in $NO_x$ emission. FIG. 2 shows by way of example the influence of injection timing SOE before top dead center of combustion and of the exhaust gas recirculation EGR rate upon particle emission Soot during alternative combustion. A slight change of injection timing SOE strongly affects particle emission Soot.

Figure 3:
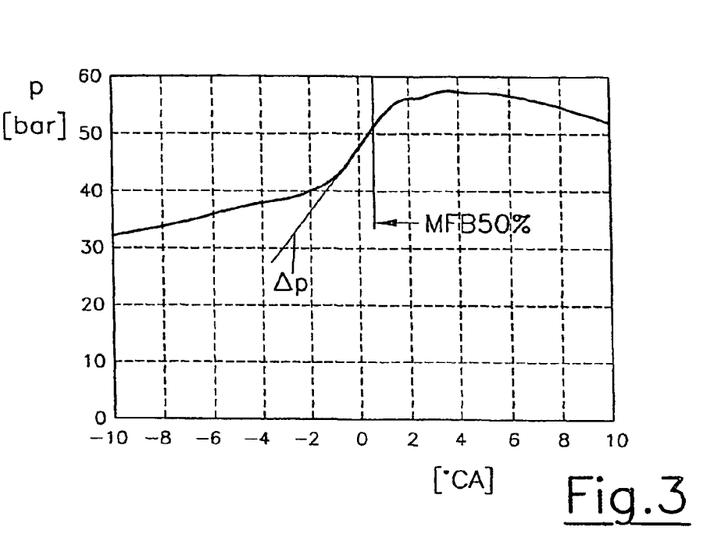

Using the method described, the in-cylinder pressure is detected by a sensor as a function of the crank angle CA for detecting the actual cylinder condition. Next, certain characteristic variables are calculated from this sensor signal in an interval of 720° crank angle CA, in the exemplary embodiment these variables being the timing of 50% mass fraction of the injected fuel burned MFB50% and the maximum in-cylinder pressure increase $\Delta p_{max}$ for each degree crank angle CA. By way of example, in FIG. 3 the in-cylinder pressure p is plotted down the side of the diagram whereas the crank angle CA is plotted on the horizontal axis and the maximum in-cylinder pressure increase $\Delta p_{max}$ as well as the 50% mass fraction burned MFB50% for a certain injection time and a certain exhaust gas recirculation rate are plotted in this diagram. Combustion noise S, start of combustion or the combustion duration may also be used as characteristic variables to describe the combustion. The characteristic cycle values are determined either by virtue of the output signal of a sensor, making use for this purpose of an acoustic, optical, electrical, thermodynamic or mechanical principle of measurement or through a mathematical model. A combination of a sensor-based approach with a model-based approach may also find application.

In the method developed, each of the actual characteristic cycle values obtained (time of the 50% mass fraction of the injected fuel burned MFB50% and the maximum pressure increase $\Delta p_{max}$) is compared with the desired values MFB50%$_{desired}$ and $\Delta p_{max}$ for the characteristic cycle values that are each stored in a characteristic diagram as a function of engine speed n and engine load L, and an existing difference between these two values is calculated.

Figure 4:
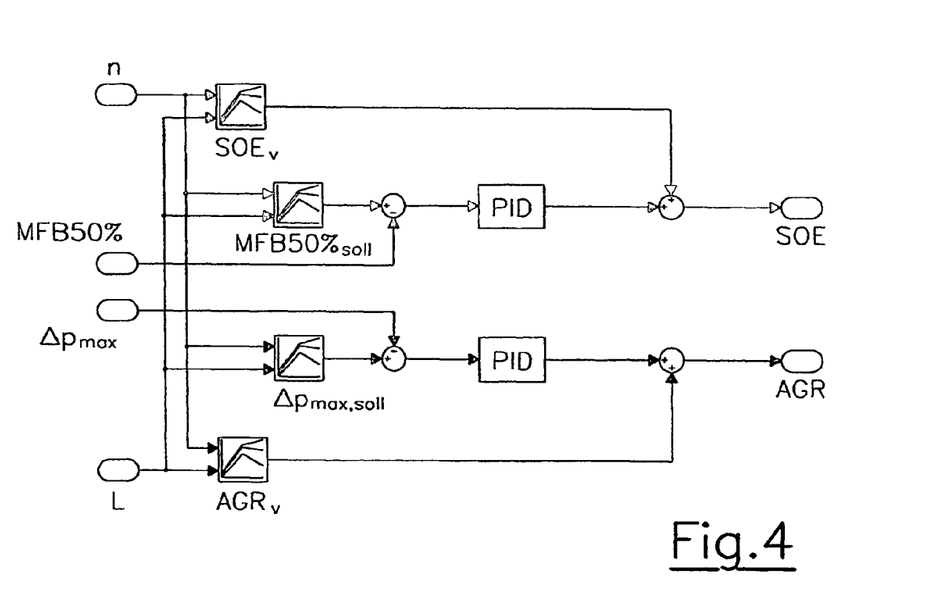

This difference is supplied to a regulation algorithm. A possible regulation structure is illustrated by way of example in FIG. 4. The PID controller dynamically calculates, on the basis of the difference between the desired value for 50% mass fraction burned MFB50%$_{desired}$ and the actual value of 50% mass fraction burned MFB50% and of the difference between the desired value for the maximum in-cylinder pressure increase $\Delta p_{max, \, desired}$ and the actual value of the maximum in-cylinder pressure increase $\Delta p_{max}$, the operation parameters needed for maintaining the desired cylinder condition, namely injection timing SOE and the exhaust gas recirculation rate EGR, for actuating the injection valve and the EGR valve or for actuating an intake valve during the exhaust stroke (or an exhaust valve during the intake stroke). A precontrol value SOEv and EGRv stored in a characteristic diagram and being for example a function of the engine speed n and the engine charge L is added to the value calculated by the PID controller in order to improve the dynamics of the system as a whole.

Figure 5:
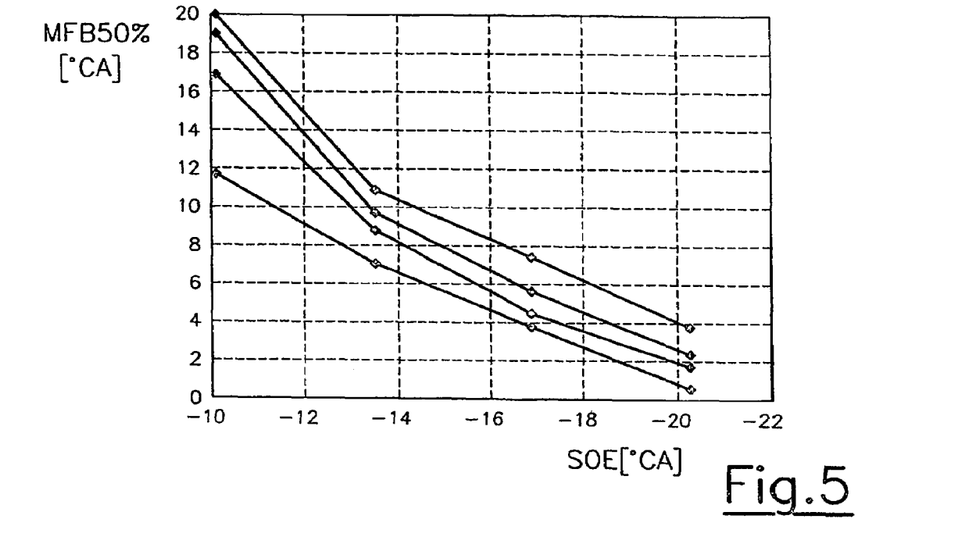

The important point with the method developed is that, in order to obtain stable control of alternative diesel combustion processes with optimum emission in the transient mode of operation of the engine as well, the combustion process, which is for example described by the timing of the 50% mass fraction burned MFB50% or of the combustion duration, is influenced, through fuel injection timing SOE calculated by the PID controller, by at least one injection event and the maximum in-cylinder pressure increase $\Delta p_{max}$ is simultaneously regulated through the inert gas fraction, meaning through the exhaust gas recirculation EGR rate. FIG. 5 illustrates by way of example how the location of the 50% mass fraction burned MFB50% plotted against fuel injection timing SOE in degrees crank angle CA can be influenced before top dead center even if the exhaust gas mass recirculated in the cylinder varies. The lines plotted in FIG. 5 characterize the points of mass fraction burned MFB50% for various exhaust gas recirculation EGR rates, with the lowermost line representing the lowermost exhaust gas recirculation rate. This makes it possible to accommodate temperature changes occurring in the transient engine mode of operation such as intake manifold temperature, exhaust gas temperature or changes in the cylinder charge (e.g., EGR fraction too high) using the method described and, as a result thereof, to ensure stable combustion of the injected fuel with optimal emission.

Figure 6:
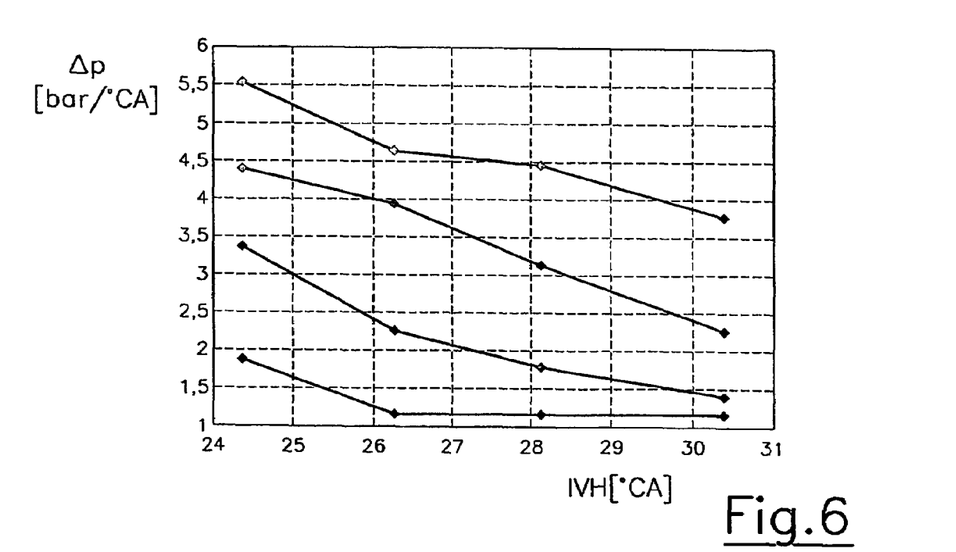
Figure 7:
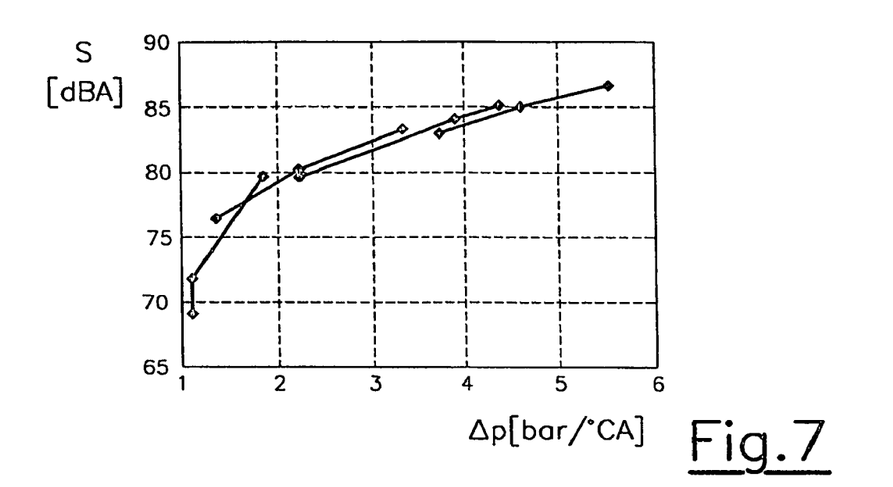

Additionally, in the method developed, the engine noise emission (described by the the maximum in-cylinder pressure increase $\Delta p_{max}$) is regulated to a desired value through the inert gas fraction in the cylinder charge. FIG. 6 illustrates by way of example how the maximum in-cylinder pressure increase $\Delta p_{max}$ and the correlated engine noise emission S may be influenced through the inert gas mass contained in the cylinder even if the time of fuel injection SOE varies. The opening duration IVH of at least one intake valve during an exhaust stroke is plotted on the ordinate, this opening duration being directly correlated with the inert gas mass. The lines plotted in the diagram show various fuel injection timings SOE, with the uppermost line representing early, the lowermost line, rather late injection timing. The correlation between the maximum in-cylinder pressure increase $\Delta p_{max}$ and the resulting combustion noise S during alternative combustion is illustrated in FIG. 7. The lines therein show various fuel injection timings SOE.

In the method developed, the inert gas mass in the cylinder can be delivered and varied either through external recirculation (that is outside of the cylinder head) or through in-cylinder recirculation (e.g., through variable intake and exhaust valve timing) or through a combination of the two kinds of recirculation.

Changing the recirculated exhaust mass by varying the intake manifold pressure (e.g. through a throttle valve or a turbocharger) or by varying the exhaust back pressure (e.g., through an exhaust turbocharger with variable through flow cross section on the side of the turbine) may also be utilized.

In the method described, the pressure history sensed by an in-cylinder pressure sensor and a speed sensor serves as a feedback on the actual condition of the combustion within the cylinder. Next, two characteristic values (time of the 50% mass fraction burned MFB50% of the injected fuel and the maximum in-cylinder pressure increase $\Delta p_{max}$) for characterizing the combustion are calculated from the pressure history. The target values for the two characteristic values are stored in characteristic diagrams that are at least dependent on speed and charge.

The present method for regulating alternative diesel combustion processes substantially differs from known methods by the following points:

1. Through a regulation algorithm, the fuel injection timing SOE and the inert gas mass are concurrently influenced on the basis of the differences between the actual characteristic values determined from the pressure history and the desired target values.
2. Accordingly, the 50% mass fraction burned MFB50% and the maximum in-cylinder pressure increase $\Delta p_{max}$ are, within the physically possible limits, simultaneously and independently of one another set on the desired target values.
3. The method also accommodates a change of parameters outside the cylinder (such as atmospheric pressure, intake air temperature, coolant temperature, exhaust back pressure, intake manifold pressure, fuel pressure) while concurrently maintaining the target values demanded (timing of the 50% mass fraction burned MFB50% of the injected fuel and maximum in-cylinder pressure increase $\Delta p_{max}$).

Figure 8:
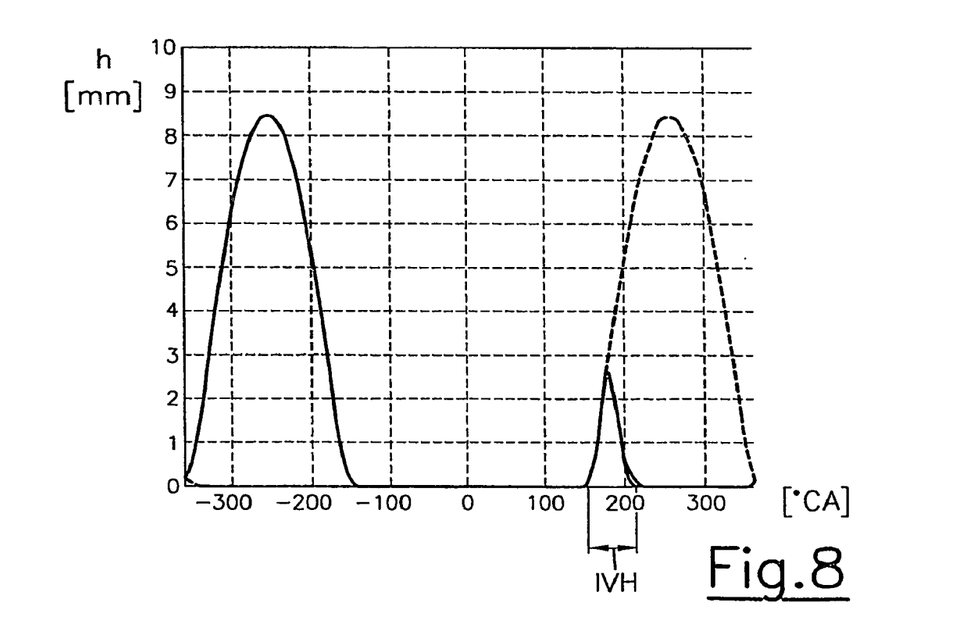

As a possible application of the method, the timing of the 50% mass fraction of the injected fuel burned MFB50% is regulated through the injection timing SOE. The maximum in-cylinder pressure increase is influenced through in-cylinder exhaust gas recirculation. The in-cylinder exhaust gas recirculation is thereby realized by additionally opening at least one intake valve during the exhaust stroke. FIG. 8 shows by way of example the valve lift curves for this kind of internal exhaust gas recirculation. The full line shows the opening of the intake valves, the dashed line, the opening of the exhaust valves. In order to influence the mass of the recirculated exhaust gas EGR and, as a result thereof, the maximum in-cylinder pressure increase $\Delta p_{max}$, the intake valve opening duration IVH at constant start of opening is changed during the exhaust stroke. Opening at least one exhaust valve during the intake stroke may also be used to carry out an internal exhaust gas recirculation. It is furthermore possible to change the valve overlap in the region of top dead center of the charge changing process in order to influence the internal recirculated mass of exhaust gas.

Figure 9:
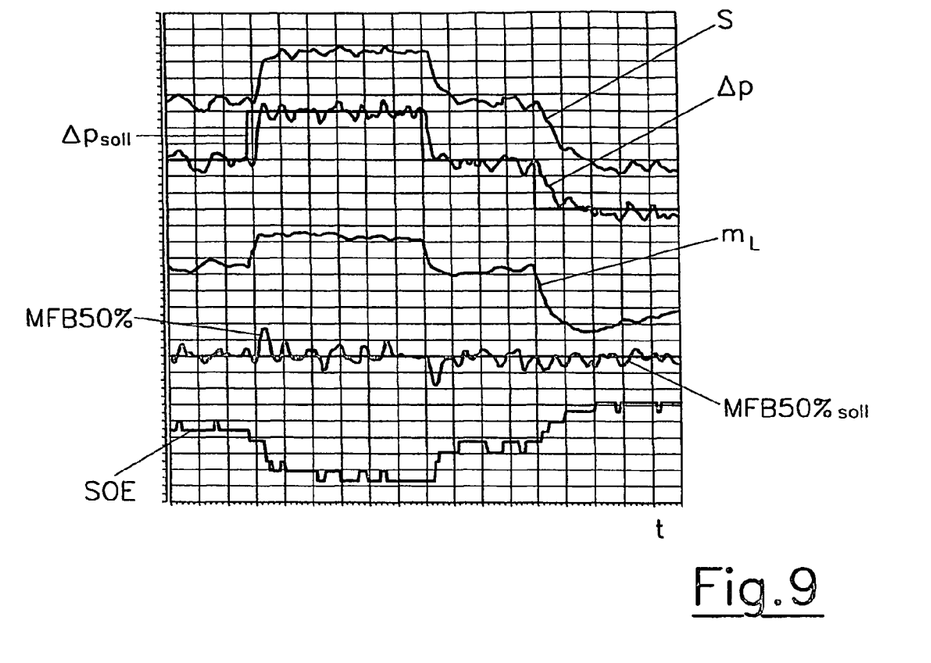
Figure 10:
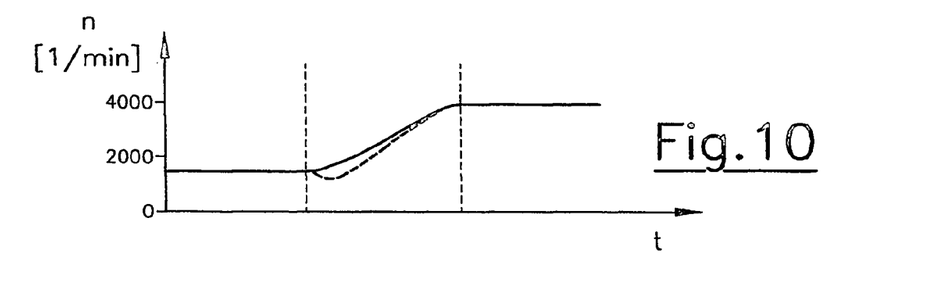

FIG. 9 shows by way of example events realized with the method developed during alternative diesel combustion in a stationary point of operation (at constant engine speed n and engine load L). The use of the method makes it possible to change e.g., the combustion noise and concurrently to keep constant the location of the 50% mass fraction burned MFB50%. The following engine operation parameters are plotted in the diagram: combustion noise S, maximum in-cylinder pressure increase $\Delta p_{max}$, desired maximum in-cylinder pressure increase $\Delta p_{max,\ desired}$, fresh air mass $m_L$, timing of the 50% mass fraction of the fuel burned MFB50%, desired timing of the 50% mass fraction of the fuel burned MFB50%$_{desired}$, injection timing SOE. The curves are plotted against time t.

Figure 11:
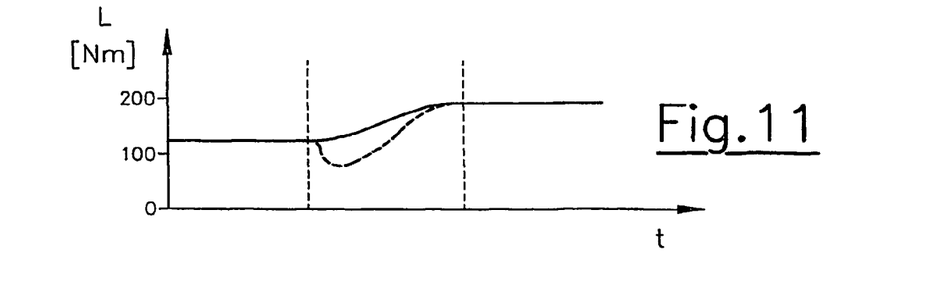
Figure 12:
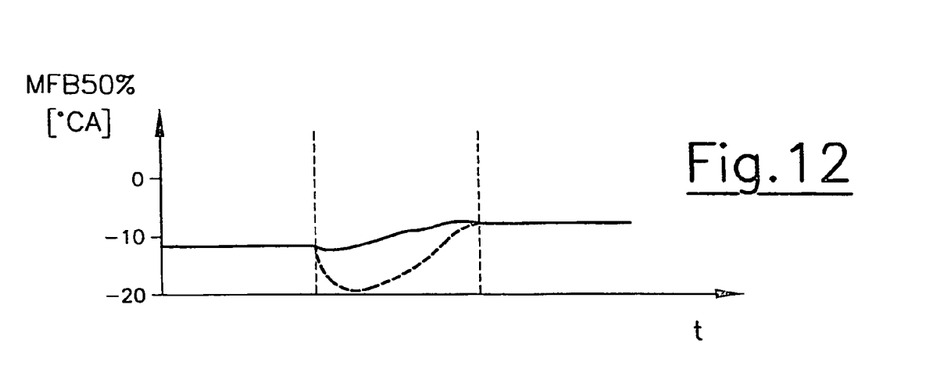

The advantages of the method for the transient mode of operation are illustrated in the FIGS. 10 through 13. If, during alternative diesel combustion, the engine load L (FIG. 11) and the engine speed n (FIG. 10) are changed to higher values simultaneously, for example when the vehicle accelerates, the exhaust gas mass in the cylinder charge is temporarily too high if the method described is not used. Since with conventional methods, the fuel injection timing is controlledly calculated from one or several characteristic diagrams, the fuel injection is too late for the actual in-cylinder gas composition in this period. In conjunction with the exhaust gas recirculation EGR rate, which is too high, this causes the 50% mass fraction burned MFB50% to be retarded (FIG. 12). This causes the engine torque L (FIG. 11) to drop because of the poor efficiency obtained with late combustion. In an extreme case, combustion can tend to become instable (misfiring). This situation is illustrated by the dashed line in the FIGS. 10 through 13.

Figure 13:
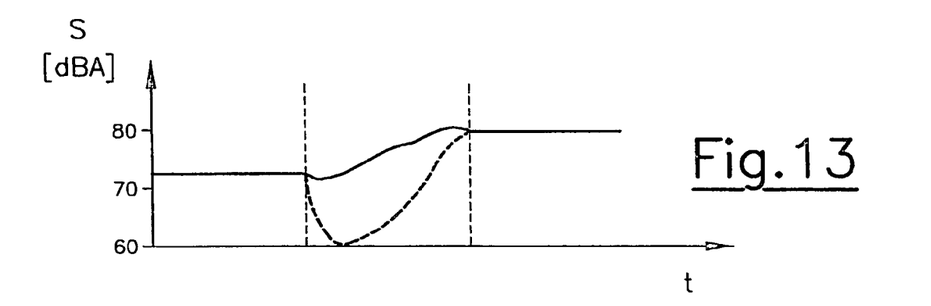

Using the method, injection timing SOE is dynamically corrected through the controller in such a manner that the timing of the 50% mass fraction burned MFB50% also meets the value demanded in the transient engine mode of operation (FIG. 12). Combustion is stabilized as a result thereof and the demanded torque history is observed (FIG. 11). Further, the combustion noise S is regulated to the value demanded by concurrently changing the exhaust mass discharged (FIG. 13). The curve of the characteristic variables of the engine speed n, load L, 50% mass fraction burned MFB50% and combustion noise S using the method is illustrated by full lines in the FIGS. 10 through 13.

Figure 14:
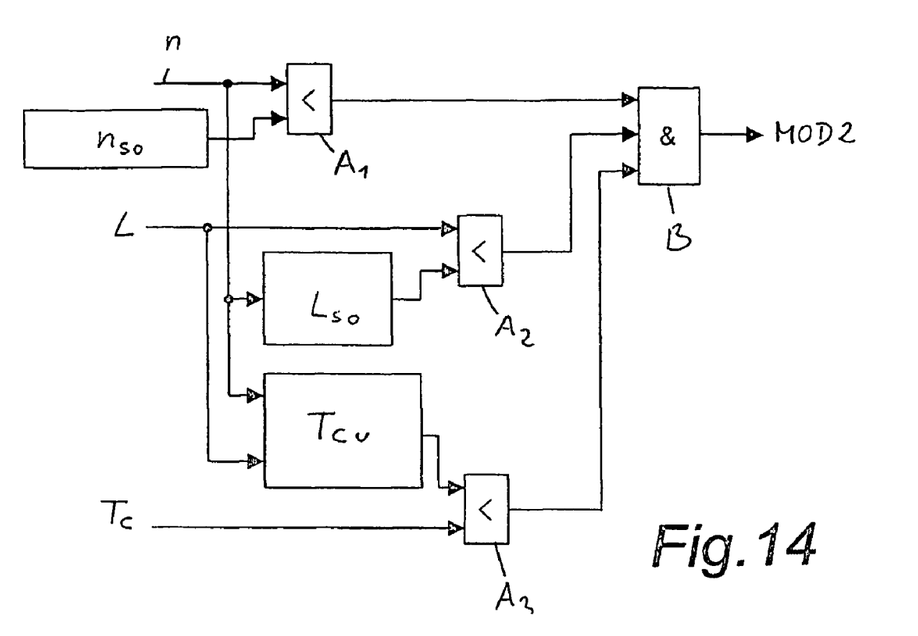

FIG. 14 schematically shows the decision structure for switching between the operation modes. In the exemplary embodiment, the characteristic engine operation parameters selected are the engine speed n, the engine charge L and the temperature of the catalytic converter $T_c$. The engine speed n is compared with an upper threshold value $n_{so}$. The engine charge L is compared with a characteristic line-based upper threshold value for the engine charge $L_{so}$ that depends on the engine speed n. The temperature of the catalytic converter $T_c$ is compared with a characteristic diagram-based lower threshold value for the temperature of the catalytic converter $T_{cu}$ that depends on the engine speed n and the engine charge L. The comparative steps are identified by $A_1, A_2, A_3$. If, in the comparative steps $A_1, A_2, A_3$, it is found that the engine speed n, the engine charge L and the temperature of the catalytic converter $T_c$ each are in the second range of values that is associated with the second mode of operation and is separated from the first range of values by the respective one of the threshold values $n_{so}, L_{so}, T_{Cu}$, an instruction is given to switch or to remain in the second mode of operation associated with the alternative diesel combustion method by means of an &-link identified by the reference character B. The second mode of operation is denoted with the reference character MOD2.

Figure 15:
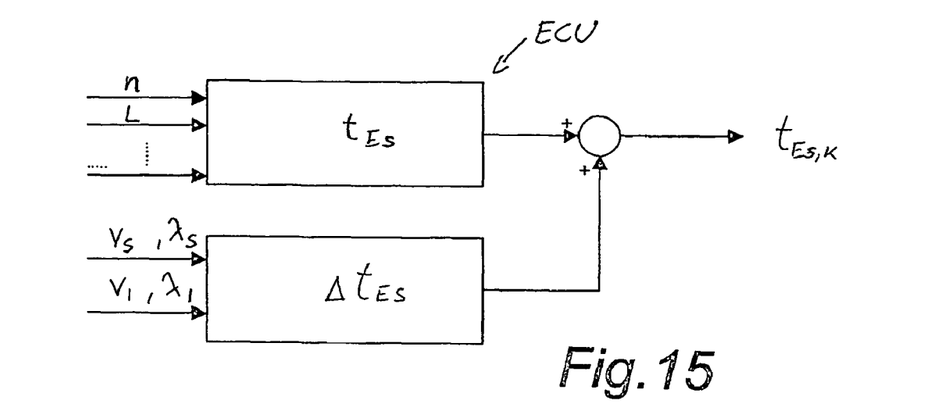

As can be seen from FIG. 15, an injection timing $t_{ES}$ is calculated in an electronic control unit ECU on the basis of the engine speed n, the engine charge L and other engine operation parameters without feedback about the actual combustion location. The desired value for the ratio fresh air mass to inert gas mass $v_s$ within the cylinder or a desired value $\lambda_s$ for the air/fuel ratio $\lambda$ in the exhaust is computed on the basis of the engine operation point. The actual value $v_I$ or $\lambda_I$ of the ratio fresh air mass to inert gas mass in the cylinder or of the air/fuel ratio $\lambda$ in the exhaust is further determined or calculated using measurement techniques. A correction value $\Delta t_{ES}$ for the desired value of injection timing $t_{ES}$ is determined on the basis of the difference between the desired values $v_s, \lambda_s$ and the actual values $v_I, \lambda_I$ of the ratio fresh air mass to inert gas mass within the cylinder or of the air/fuel ratio $\lambda$ in the exhaust. If the actual value $v_I$ or $\lambda_I$ of the ratio fresh air mass to inert gas mass in the cylinder or of the air/fuel ratio $\lambda$ in the exhaust is smaller than the desired value $v_s$ or $\lambda_s$ of the ratio fresh air mass to inert gas mass of the air mass or of the air/fuel ratio $\lambda$ in the exhaust, the injection timing $t_{ES}$ is advanced by an additive correction for example. If, by contrast, the actual value $v_I$ or $\lambda_I$ of the ratio fresh air mass to inert gas mass or of the air/fuel ratio $\lambda$ is greater than the desired value $v_s$ or $\lambda_s$ of the ratio fresh air mass to inert gas mass in the cylinder or of the air/fuel ratio $\lambda$ in the exhaust, the injection timing $t_{ES}$ is retarded. The result of this process is a corrected injection timing $t_{ES,\ K}$.

Figure 16:
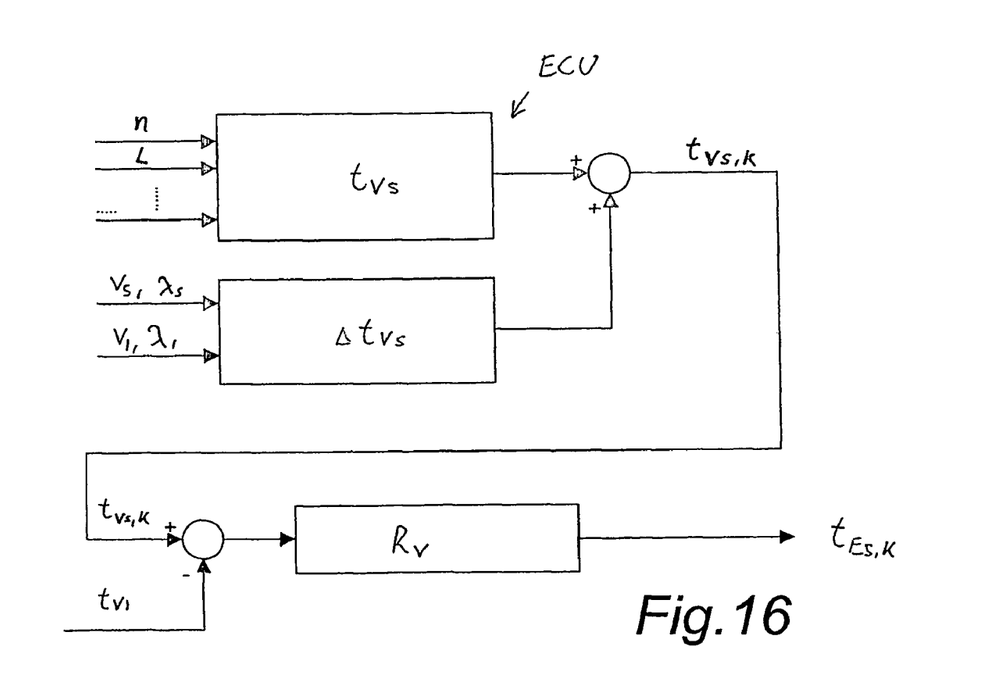

In the implementation variant illustrated in FIG. 16, the injection timing $t_{ES,\ K}$ is calculated through a combustion regulator $R_v$ that takes into consideration actual values $t_{vI}$ about the actual combustion situation. In an electronic control unit ECU, a desired value $t_{vs}$ for the combustion situation is determined from the engine speed n and the engine charge L. A desired value $v_s$ or $\lambda_s$ for the ratio fresh air mass to inert gas mass in the cylinder or of the air/fuel ratio $\lambda$ in the exhaust is prescribed on the basis of the operating condition of the engine. The actual value $v_I$ or $\lambda_I$ of the ratio fresh air mass to inert gas mass in the cylinder or of the air/fuel ratio $\lambda$ in the exhaust is determined continuously or discontinuously. A correction factor $\Delta t_{vs}$ for the desired value of the combustion situation $t_{vs}$ is calculated on the basis of the difference between the desired values $v_s$, $\lambda_s$ and the actual values $v_I, \lambda_I$ and the desired value $t_{vs}$ for the combustion situation is corrected dynamically, for example additively. If the actual value $v_I, \lambda_I$ of the ratio fresh air mass to inert gas mass in the cylinder or of the air/fuel ratio $\lambda$ in the exhaust is smaller than the desired value $v_s$ or $\lambda_s$ of the ratio fresh air mass to inert gas mass in the cylinder or of the air/fuel ratio in the exhaust, the demanded desired value $t_{vs}$ for the combustion situation is corrected by being advanced. If the actual value $v_I$ or $\lambda_I$ is greater than the desired value $v_s$ or $\lambda_s$ of the ratio fresh air mass to inert gas mass in the cylinder or of the air/fuel ratio $\lambda$ in the exhaust, the demanded desired value $t_{vs}$ for the combustion situation is corrected by being retarded. In the regulator of the combustion situation, the corrected desired value $t_{vs,K}$ is compared with the actual value $t_{vI}$ of the combustion situation and a corrected desired value $t_{ES,K}$ is calculated therefrom for injection timing.

The dynamic correction of injection timing by comparing the actual values $v_I$ or $\lambda_I$ with the desired values $v_s$ or $\lambda_s$ of the ratio fresh air mass to inert gas mass in the cylinder or of the air/fuel ratio $\lambda$ in the exhaust permits to avoid, in dynamic engine operation, a difference between the resulting transient and the corresponding stationary combustion noise due to transiently occurring differences of the cylinder charge with respect to the stationary desired value.

The wording of the patent claims filed together with the application is a mere proposal and without prejudice for obtaining a larger patent protection. The applicant reserves the right to claim further features which hereto before have only been disclosed in the specification and/or the drawings.

Backreferences used in the dependent claims are directed to further complement the subject matter of the main claim with the features of a respective one of the dependent claims; they are not to be understood as obviating the right of achieving an independent, subject matter protection for the features of the dependent claims that are referring back.

The subject matters of these dependent claims however also form independent inventions that comprise a design independent of the subject matters of the previous dependent claims.

The invention is not limited to the exemplary embodiment(s) of the specification. Numerous modifications and changes, more specifically such variants, elements and combinations and/or materials that are e.g., inventive by combining or varying discrete features or elements or method steps in conjunction with those described in the general specification and embodiments as well as in the claims and contained in the drawings and that lead, by combining the features, to a novel subject matter or to novel method steps or method step sequences, also as far as they concern methods of manufacturing, inspecting and working, are possible without departing from the scope of the invention.

What is claimed is:

1. A method of operating an internal combustion engine with homogeneous fuel combustion, wherein a condition variable in a cylinder is determined as a function of a crank angle and a signal about a cylinder condition is obtained therefrom, wherein at least two characteristic cycle values from a group comprising mass fraction of injected fuel burned, maximum pressure increase in the cylinder, combustion noise, start of combustion or duration of combustion are determined from the cylinder condition signal, the determined characteristic cycle values are compared with desired values for the characteristic cycle values entered in a characteristic diagram and a given difference between the two values is computed and the difference is supplied to a regulation algorithm and a time of fuel ignition of at least one injection event or an inert gas fraction in the cylinder is adjusted as a correcting variable in order to stabilize combustion and to minimize noise and exhaust emission, wherein the condition variable is selected from pressure and temperature.

2. The method according to claim 1, wherein the characteristic cycle values are determined either from an output signal of a sensor making use of an acoustic, optical, electrical, thermodynamic or mechanical principle of measurement, through a mathematical model or by combining a sensor-based and a model-based approach.

3. The method according to claim 1, wherein a 50% mass fraction of an injected fuel burned and a maximum in-cylinder pressure increase are determined as the characteristic cycle values.

4. The method according to claim 1, wherein supply and variation of an inert gas mass within the cylinder is carried out through external exhaust gas recirculation or through in-cylinder exhaust gas recirculation or by combining internal and external exhaust gas recirculation.

5. The method according to claim 1, wherein control variables of fuel injection timing of at least one injection event and inert gas fraction within the cylinder are adjusted simultaneously by means of the regulation algorithm.

6. The method according to claim 1, wherein a precontrol value that is dependent on an operating condition of the engine and has been entered in a respective characteristic diagram is added to a respective one of the values calculated for the control variables through the regulation algorithm.

7. A method of operating an internal combustion engine, wherein a condition variable in a cylinder is determined as a function of a crank angle and a signal about a cylinder condition is obtained therefrom, wherein at least two characteristic cycle values from a group comprising mass fraction of injected fuel burned, maximum pressure increase in the cylinder, combustion noise, start of combustion or duration of combustion are determined from the cylinder condition signal, the determined characteristic cycle values are compared with desired values for the characteristic cycle values entered in a characteristic diagram and a given difference between the two values is computed and the difference is supplied to a regulation algorithm and a time of fuel ignition of at least one injection event or an inert gas fraction in the cylinder is adjusted as a correcting variable in order to stabilize combustion and to minimize noise and exhaust emission, and wherein a 50% mass fraction of an injected fuel burned and a maximum in-cylinder pressure increase are determined as the characteristic cycle values.

8. The method according to claim 7, wherein the condition variable is selected from a group comprising pressure, temperature, ion flow and output signal of an optical principle of measurement.

9. The method according to claim 7, wherein the characteristic cycle values are determined either from an output signal of a sensor making use of an acoustic, optical, electrical, thermodynamic or mechanical principle of measurement, through a mathematical model, or by combining a sensor-based and a model-based approach.

10. The method according to claim 7, wherein supply and variation of an inert gas mass within the cylinder is carried out through external exhaust gas recirculation or through in-cylinder exhaust gas recirculation or by combining internal and external exhaust gas recirculation.

11. The method according to claim 7, wherein control variables of fuel injection timing of at least one injection event and inert gas fraction within the cylinder are adjusted simultaneously by means of the regulation algorithm.

12. The method according to claim 7, wherein a precontrol value that is dependent on an operating condition of the engine and has been entered in a respective characteristic diagram is added to a respective one of the values calculated for the control variables through the regulation algorithm.

13. A method of operating an internal combustion engine, wherein a condition variable in a cylinder is determined as a function of a crank angle and a signal about a cylinder condition is obtained therefrom, wherein at least two characteristic cycle values from a group comprising mass fraction of injected fuel burned, maximum pressure increase in the cylinder, combustion noise, start of combustion or duration of combustion are determined from the cylinder condition signal, the determined characteristic cycle values are compared with desired values for the characteristic cycle values entered in a characteristic diagram and a given difference between the two values is computed and the difference is supplied to a regulation algorithm and a time of fuel ignition of at least one injection event or an inert gas fraction in the cylinder is adjusted as a correcting variable in order to stabilize combustion and to minimize noise and exhaust emission, and wherein control variables of fuel injection timing of at least one injection event and inert gas fraction within the cylinder are adjusted simultaneously by means of the regulation algorithm.

14. The method according to claim 13, wherein the condition variable is selected from pressure, temperature, ion flow and output signal of an optical principle of measurement.

15. The method according to claim 13, wherein the characteristic cycle values are determined either from an output signal of a sensor making use of an acoustic, optical, electrical, thermodynamic or mechanical principle of measurement, through a mathematical model or by combining a sensor-based and a model-based approach.

16. The method according to claim 13, wherein a 50% mass fraction of an injected fuel burned and a maximum in-cylinder pressure increase are determined as the characteristic cycle values.

17. The method according to claim 13, wherein supply and variation of an inert gas mass within the cylinder is carried out through external exhaust gas recirculation or through in-cylinder exhaust gas recirculation or by combining internal and external exhaust gas recirculation.

18. The method according to claim 13, wherein a precontrol value that is dependent on an operating condition of the engine and has been entered in a respective characteristic diagram is added to a respective one of the values calculated for the control variables through the regulation algorithm.

19. A method of operating an internal combustion engine, wherein a condition variable in a cylinder is determined as a function of a crank angle and a signal about a cylinder condition is obtained therefrom, wherein at least two characteristic cycle values from a group comprising mass fraction of injected fuel burned, maximum pressure increase in the cylinder, combustion noise, start of combustion or duration of combustion are determined from the cylinder condition signal, the determined characteristic cycle values are compared with desired values for the characteristic cycle values entered in a characteristic diagram and a given difference between the two values is computed and the difference is supplied to a regulation algorithm and a time of fuel ignition of at least one injection event or an inert gas fraction in the cylinder is adjusted as a correcting variable in order to stabilize combustion and to minimize noise and exhaust emission, and wherein a precontrol value that is dependent on an operating condition of the engine and has been entered in a respective characteristic diagram is added to a respective one of the values calculated for the control variables through the regulation algorithm.

20. The method according to claim 19, wherein the condition variable is selected from pressure, temperature, ion flow and output signal of an optical principle of measurement.

21. The method according to claim 19, wherein the characteristic cycle values are determined either from an output signal of a sensor making use of an acoustic, optical, electrical, thermodynamic or mechanical principle of measurement, through a mathematical model or by combining a sensor-based and a model-based approach.

22. The method according to claim 19, wherein a 50% mass fraction of an injected fuel burned and a maximum in-cylinder pressure increase are determined as the, characteristic cycle values.

23. The method according to claim 19, wherein supply and variation of an inert gas mass within the cylinder is carried out through external exhaust gas recirculation or through in-cylinder exhaust gas recirculation or by combining internal and external exhaust gas recirculation.

24. The method according to claim 19, wherein control variables of fuel injection timing of at least one injection event and inert gas fraction within the cylinder are adjusted simultaneously by means of the regulation algorithm.

* * * * *